Aug. 30, 1938.  E. E. PRYOR  2,128,430
FISHING TOOL
Filed Feb. 8, 1937  2 Sheets-Sheet 1
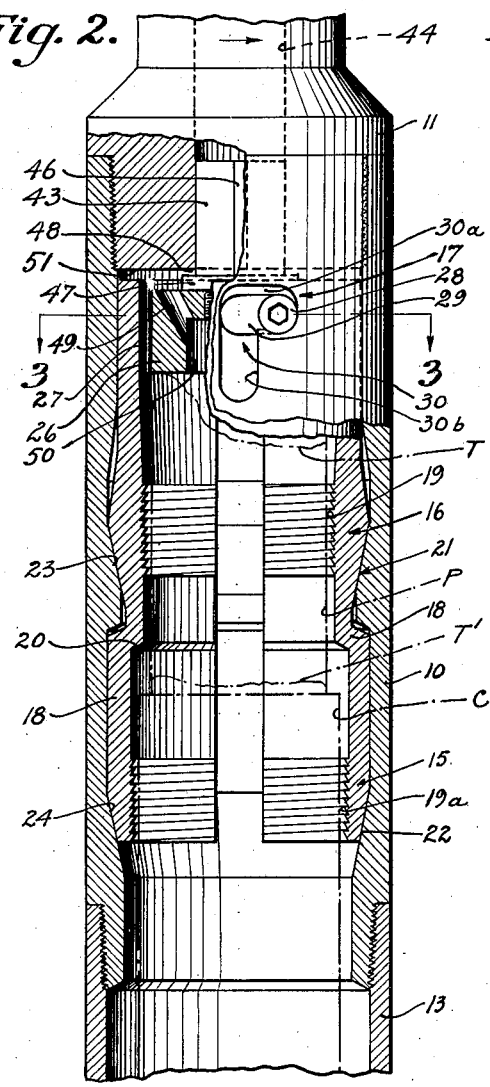
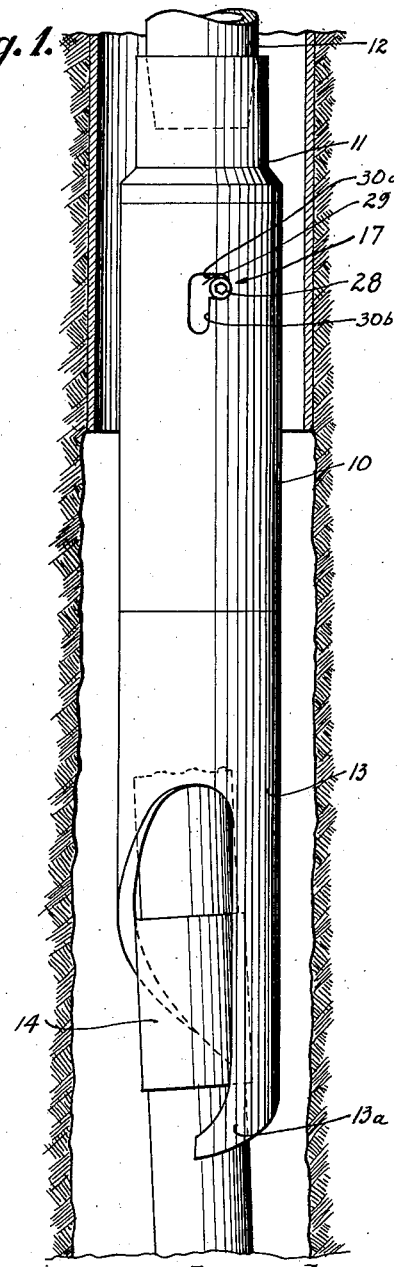
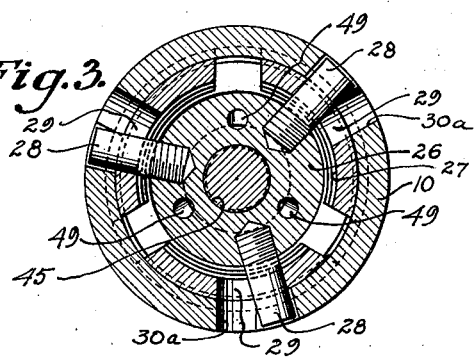
Inventor.
Elmer E. Pryor.
Attorney.

Aug. 30, 1938.  E. E. PRYOR  2,128,430
FISHING TOOL
Filed Feb. 8, 1937  2 Sheets-Sheet 2

Inventor.
Elmer E. Pryor.

Attorney.

Patented Aug. 30, 1938

2,128,430

UNITED STATES PATENT OFFICE 2,128,430

FISHING TOOL

Elmer E. Pryor, Fullerton, Calif.

Application February 8, 1937, Serial No. 124,549

7 Claims. (Cl. 294—102)

This invention has to do with improvements in oil well fishing tools, and has for its primary object to provide a tool of the overshot type having general utility in the sense that it is capable of attachment to lodged objects whose dimensions or diameters may vary within substantial limits.

The invention is concerned particularly with fishing tools of the overshot or socket type which may be described generally as comprising a tubular body containing relatively longitudinally and radially movable means adapted to be brought into gripping engagement with the fish by lowering the tool so that the fish is thrust into the body. Fishing tools of this type, and on which the present invention is an improvement, constitute the subject matter of Patent No. 1,812,059, granted June 30, 1931, to me on Combination trip socket for fishing tools. In the usual overshot fishing tool, as exemplified by the patent, there is provided but a single gripping means having a limited degree of radial contractive movement, and corresponding capacity for engaging and retaining fish of different diameters. Consequently, through necessity the general practice has been to make the tools in various different sizes and to select for a given fishing operation the size tool that will correspond to the size of the lodged object, insofar as the latter can be determined. In addition to the necessity for having to use different size tools, there has been a further disadvantage in that it has not been possible in all situations to determine in advance of trial, the particular size of that part of the fish where the attachment has to be made.

In accordance with the invention, I provide a series of gripping means arranged longitudinally of the tool and having different degrees of radial contractibility, preferably of decreasing contractibility in upward progression, so that for a fish of given size or diameter, there is provided a gripping means that within its range of contraction, will engage and retain the fish. By providing a plurality of such gripping means, two or three usually sufficing to accommodate the variance in size of fish ordinarily encountered, I obtain in a single tool the capacity to grip and retain different size objects whose dimensional variance ordinarily would require the use of different tools that have to be specially selected in conformity with the size of a particular fish to be recovered.

Although the present tool may be made in various specific forms within the broad aspects of the invention, it is preferred, in furtherance of simplicity, strength and ruggedness, to make the gripping means in the form of elongated wedge slips having on their inner surfaces a series of offset gripping faces having different degrees of contractibility. Preferably, I also provide suitable means for releasably holding the slips in elevated position within the body, so that the tool may be set down over the fish with the slips in expanded position, and the holding means then released to permit the slips to radially contract into gripping engagement with the fish.

The invention embodies a number of additional features having to do more with the particular details of construction, but all these, as well as the more general aspects of the invention mentioned in the foregoing, may be fully understood from the following description of the invention in certain illustrative and typical forms. Throughout the description reference is had to the accompanying drawings, in which:

Fig. 1 is an elevation showing the tool set down over a piece of pipe to be removed from the well;

Fig. 2 is an enlarged view, mostly in section, showing the upper portion of tool above the guide, with the slips held in raised position;

Fig. 3 is a section on line 3—3 of Fig. 2;

Figure 4:
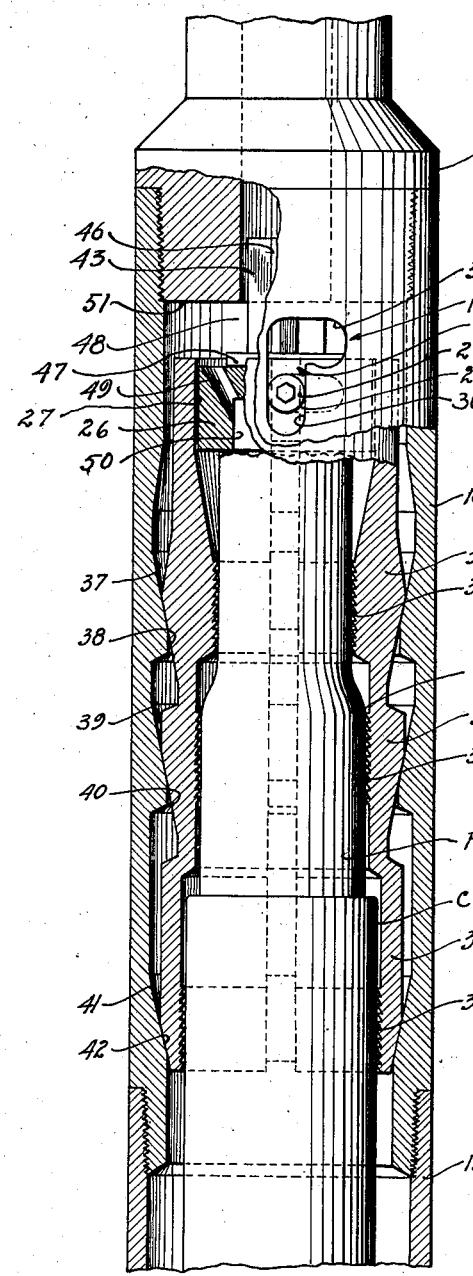
Fig. 4 is a sectional view similar to Fig. 2, showing a variational form of the invention.

Referring first to Fig. 1, the tool comprises a tubular body 10 connected by coupling 11 with a pipe string 12 on which the tool is lowered into the well. Preferably, though not necessarily, the body may carry at its lower end a suitable guide 13 to assist in engaging and centering the fish 14 within the well and to a position of alinement with the body bore. As illustrated, the guide 13 may have a general hooked configuration such that upon rotation and lowering, its lower end 13a will engage and center within the guide and body an object that may be lying in an inclined position.

As illustrated in Fig. 2, the fishing tool comprises a series of radially contractible gripping means, generally indicated at 15 and 16, arranged longitudinally of the body, and normally held in expanded position by releasable supporting means 17. It will be understood that any suitable number of individual gripping means may be employed, in accordance with the aggregate range of operation desired in a single tool. As illustrative, I have shown two such gripping means in Fig. 2, and three in the variant form of the invention illustrated in Fig. 4. The series of individual gripping means 15 and 16 preferably are formed by means of elongated slips 18 having inner serrated gripping faces 19, 19a extending in substantially axial or longitudinal alinement with the body 10, and offset radially inward in upward progression, the offset being indicated by shoulder 20. The outer surfaces of the slips have wedging engagement with the body along the inclined slip faces 21 and 22, and the correspondingly inclined body surfaces 23 and 24, each pair of the inclined wedge surfaces preferably being located substantially directly opposite the inner gripping faces 19 and 19a of the slips. It is apparent that by lowering the slips from their raised positions, in Fig. 2, they are caused to move radially inward to contract the gripping faces about the work, and that by reason of their relative offsets, the upper gripping means 16 will contract radially to a greater degree than the lower gripping means 15.

Normally the slips are retained in elevated and radially expanded positions by the releasable holding means 17, which it will be understood may be of any suitable type and construction capable of release by way of the suspension pipe 12 when the tool is positioned to engage the fish. As typical, I have illustrated at 17 a form of releasable holding means generally similar to the type disclosed in my issued patent referred to above. The holding means comprises a circular plate 26 having sufficient annular clearance at 27 from the wall of the body 10 to permit radial bodily movement of the slips within the limits of their expanded and contracted positions. The slips are loosely supported on pins 28, see Fig. 3, threaded radially into plate 26 and extending through horizontal slots 29 in the slips. The pins terminate within angularly shaped slots 30 in the body 10, slots 30 having horizontal portions 30a co-extensive with the slip slots 29 and within which pins 28 are normally received, and downwardly extending portions 30b into which the pins may be turned and dropped to lower the plate and slip assembly.

The capacity of the tool for gripping and retaining objects of different sizes or diameters may be illustrated by reference to the pipe P illustrated in dot-dash lines in Fig. 2. Assuming a twist-off to have occurred at T above the pipe collar C, and the tool to have been lowered over the fish to the position illustrated in which plate 26 is brought to bear against the upper end of the pipe P, the holding means 17 may be released by counter-clockwise rotation of the pipe string 12 and body 10 to the point at which pins 28 are backed out of the horizontal portions 30a of the slots into alinement with the vertically extending portions 30b, the pins being held against rotation by the engagement of the plate with the upper end of the pipe. By then elevating the body, slips 18 are constricted radially to bring their faces 19 into gripping engagement with the pipe P. Where the relative offset of the gripping faces 19 and 19a is made to correspond with the pipe coupling offset, the coupling may be engaged by gripping face 19a.

Assuming now the twist-off to have occurred at T", or so close to the collar C as to prevent the pipe above the collar from becoming engaged by slip faces 19, the tool may be lowered to the point of bringing the slip shoulder 20 into engagement with the top collar shoulder. The slips are then released, as explained, to cause the faces 19a to grip the pipe collar, pins 28 being held against rotation by the engagement of the slips with the collar.

In Fig. 4 of the drawings I show a variational form of the invention similar to that explained with reference to Fig. 2, except that the slips 33 are provided with three sets of gripping faces 34, 35 and 36 offset inwardly of the body in upward progression, with three sets 37—38, 39—40, and 41—42 of complementary wedge surfaces formed on the body and slips opposite the gripping faces. Here, three sets of gripping means are provided so that the tool is capable of gripping any lodged object whose diameter comes within the constrictive range differential of the upper and lowermost gripping faces 34 and 36. Assuming the fish to consist of an externally upset pipe P', and the twist-off to occur above the upset U, the slip offsets may, though not necessarily, be such that the gripping faces 34, 35 and 36 are brought to engage all three diameters of the pipe and coupling. If the twist-off occurs at the upset taper, one or both of the gripping faces 35 and 36 will engage and retain the pipe, while in the event of a twist-off directly above the collar C', the fish will be retained by the lowermost gripping faces.

Figure 5:
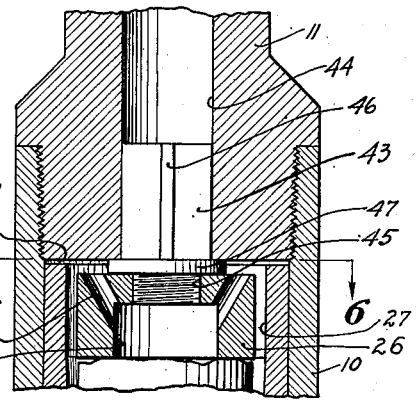
Fig. 5 is a fragmentary section illustrating the slip supporting member guide and associated parts.
Figure 6:
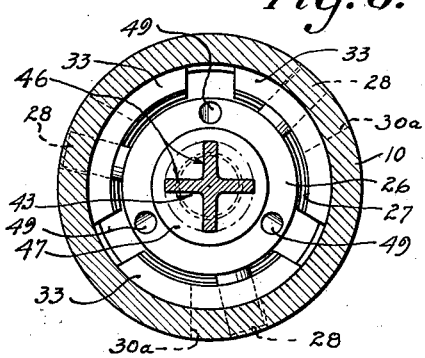
Fig. 6 is a section on line 6—6 of Fig. 5.

The invention also contemplates improvements with reference to the slip supporting means 17, and also in the provision of means for ascertaining when the tool has become lowered to proper releasing position above the fish. At times it has been found that the slips are subjected to excessive strains and breakage by reason of an unevenness in the application of forces, resulting from the supporting plate 26 having become horizontally tilted out of proper alinement with the body. For the purpose of confining the supporting plate against tilting and to movement in longitudinal alinement with the body axis, I provide on the plate a guide 43, see Fig. 5, projecting upwardly within the bore 44 of coupling 11 and slidably engaging the wall thereof. While any suitable form of guide may be used, I have shown as illustrative, a guide having a threaded connection at 45 with the plate 26, and provided with webs 46 terminating at an annular flange 47 projecting beyond the coupling bore 44.

In the normal position of the parts shown in Fig. 2, circulating fluid may be discharged downwardly through bore 44 between the guide webs 46, then outwardly through the clearance space 48 above flange 47, and thence downwardly through the body by way of ports 49, the plate counterbore 50, and clearance space 27 around the plate. When the fish is centered within the tool and the body is lowered to the point of engaging plate 26, or the slip shoulder 20, with the upper end of the fish, the lower end 51 of coupling 11 is caused to seat on flange 47, sufficient clearance being provided between the slip supporting pins 28 and the top of slots 30a to permit seating of surface 51 on the flange. The movement together of the coupling end and flange 47 acts as a valve to shut off or restrict the flow of circulating fluid through the tool. As a result, there is developed an increase in the circulating fluid pressure that indicates to the operator at the ground surface that the tool is properly positioned to engage and remove the fish.

I claim:

1. In a tool of the character described, the combination comprising a body, a plurality of elongated slips movable vertically and radially within said body, each slip having in its inner surface a pair of longitudinally arranged gripping faces, the lower gripping face being offset radially outward from the upper gripping face, and vertically spaced individual pairs of cooperating wedge faces on the body and outer surfaces of the slips, said slips being bodily expansible into an annular space within the body between the said wedge faces thereon.

2. In a tool of the character described, the combination comprising a body, a plurality of elongated slips movable vertically and radially within said body, each slip having in its inner surface a pair of longitudinally arranged gripping faces, the lower gripping face being offset radially outward from the upper gripping face, and vertically spaced individual pairs of cooperating wedge faces on the body and outer surfaces of the slips directly opposite said gripping faces on the inner surfaces of the slips, said slips being bodily expansible into an annular space within the body between the said wedge faces thereon.

3. In a tool of the character described, the combination comprising a body, a plurality of elongated slips movable vertically and radially within said body, each slip having on its inner surface a pair of longitudinally arranged gripping faces, the lower gripping face being offset radially outward from the upper gripping face, vertically spaced individual pairs of cooperating wedge faces on the body and outer surfaces of the slips, said slips being bodily expansible into an annular space within the body between the said wedge faces thereon, and releasable means holding said slips and gripping faces in elevated and radially expanded position within the body.

4. In a tool of the character described, the combination comprising a body, a plurality of elongated slips movable vertically and radially within said body, each slip having on its inner surface a pair of longitudinally arranged gripping faces, the lower gripping face being offset radially outward from the upper gripping face, vertically spaced individual pairs of cooperating wedge faces on the body and outer surfaces of the slips directly opposite said gripping faces on the inner surfaces of the slips, said slips being bodily expansible into an annular space within the body between the said wedge faces thereon, releasable means holding said slips in elevated and radially expanded position within the body, and upwardly facing shoulders on the slips between said wedge faces adapted to be brought directly adjacent downwardly facing shoulders on the body when the slips are in fully expanded positions.

5. In a tool of the character described, a vertically extending tubular body, a supporting member mounted within the body and movable vertically relative thereto, a gripping element loosely mounted on said member and radially movable within a space between the outside of said member and the body wall, means whereby vertical movement of the supporting member causes said gripping element to move radially within the body, and guide means above said member confining it for movement axially of the body.

6. In a tool of the character described, a vertically extending tubular body having at its upper end a reduced diameter bore, a supporting member mounted within the body and movable vertically relative thereto, a gripping element loosely mounted on said member and radially movable within a space between the outside of said member and the body wall, means whereby vertical movement of the supporting member causes said gripping element to move radially within the body, and guide means projecting upwardly from said member within said bore.

7. In a tool of the character described, a vertically extending tubular body containing a circulating fluid passage, a supporting member mounted within the body and movable vertically relative thereto, said member containing a fluid passage extending downwardly therethrough, a gripping element loosely mounted on said member and radially movable within a space between the outside of said member and the body wall, means whereby vertical movement of the supporting member causes said gripping element to move radially within the body, and means whereby movement of said supporting member to its uppermost position restricts fluid circulation through said passage.

ELMER E. PRYOR.